INVENTOR
Holger Krohn
By
Watson, Cole, Grindle & Watson
Attys.

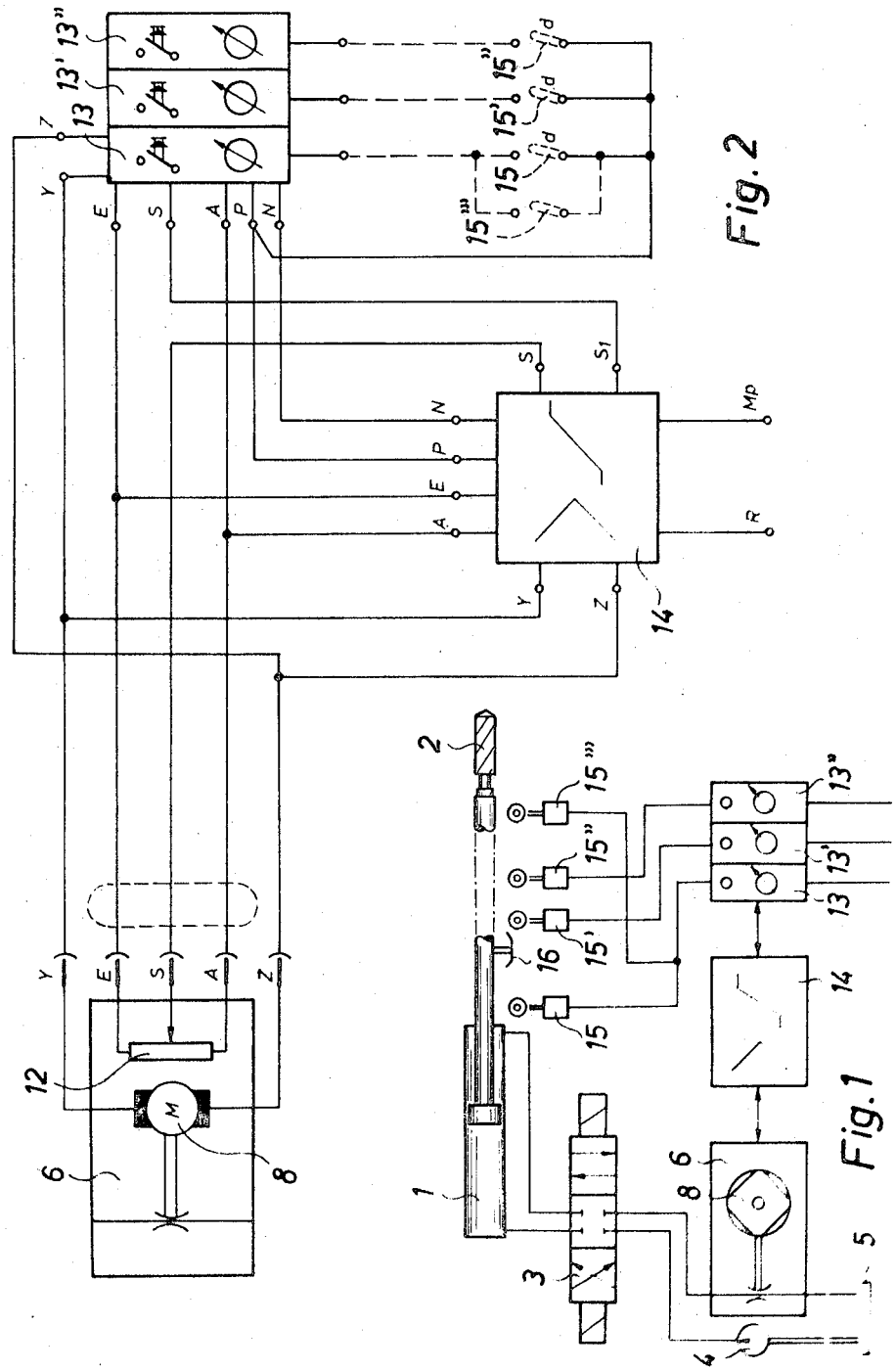

United States Patent Office 3,548,283
Patented Dec. 15, 1970

3,548,283
ON-OFF WHEATSTONE BRIDGE APPARATUS CONTROLLING THE OPERATION OF AN ELECTRIC SERVOMOTOR INCLUDING DYNAMIC BRAKING AT BALANCE
Holger Krohn, Wombach, Germany, assignor to Firma G. L. Rexroth, Lohrer Eisenwerk G.m.b.H., Lohr (Main), Germany
Filed Oct. 25, 1967, Ser. No. 678,047
Claims priority, application Germany, Oct. 29, 1966, R 44,486; Mar. 4, 1967, R 45,433
Int. Cl. G05b 5/01, 11/14
U.S. Cl. 318—674                    3 Claims

ABSTRACT OF THE DISCLOSURE

An apparatus for controlling the operation of an electric servomotor of a flow control valve for operating a hydraulic cylinder by means of a bridge circuit which comprises a nominal-value potentiometer in one branch of the bridge and an actual-value potentiometer in the other branch which is dependent upon the rotary position of the drive shaft of the motor. The output voltage of the bridge after being amplified serves for driving the motor so as to adjust the flow control valve. The apparatus further comprises a pair of relays which, when both of them are in their normal positions, will short-circuit the motor, while when either of them is actuated dependent upon the polarity of the output voltage of the bridge, it connects the motor to the amplifier so that a voltage is then supplied to the motor to start the same to which another voltage is then added which is amplified in proportion to the output voltage of the bridge.

---

The present invention relates to an apparatus for controlling the operation of an electric servo-motor, preferably a shunt-wound direct current motor, of a flow control valve for operating a hydraulic cylinder. This apparatus comprises an electric measuring bridge one branch of which contains an adjustable nominal-value setter and its other branch an actual-value setter which is dependent upon the rotary position of the drive shaft of the servomotor, wherein the output voltage of this bridge after being amplified by an amplifier serves for driving the servomotor. In place of the usual field excitation of the shunt-wound direct current motor by its shunt winding, it is also possible to employ a permanent magnet.

It is an object of the present invention to provide an apparatus of the type as above described which is designed so as to permit the electric servomotor to be adjusted extremely quickly from any desired point. According to the invention, this object is attained by providing two relays which, when both of them are in their normal or rest positions, will short-circuit the armature of the servomotor and by providing a control unit which is composed of a relay section and a regulating section. This relay section is designed so as to be actuated by a low voltage and to operate one or the other of the two relays depending upon the polarity of the output voltage of the bridge. The actuated relay will then connect the armature of the servomotor with the regulating section which supplies this motor with a voltage of a sufficient strength for starting it and to which a voltage is added which is amplified in proportion to the output voltage of the bridge. The servomotor is preferably provided in the form of a shunt-wound direct current motor with an adjustable speed and the best possible braking capacity. The regulating section of the control unit in cooperation with this motor produces an approximately logarithmic regulating characteristic which permits the periods which are required for adjusting the motor to be made extremely short and the final correction or unbalance error to be extremely small. The relay section is provided in the form of a bipolar input stage which has a low adjustable actuating voltage. When the regulating section is connected by one of the relays to the servomotor, the latter will start immediately and be driven in a direction which depends upon which of the two relays is actuated. When the bridge is balanced, both relays are deenergized and the servomotor will be stopped by being short-circuited by the normally closed or rest contacts of the relays.

If for amplifying the bridge voltage which is required for driving the servomotor and especially a shunt-wound direct current motor an amplifier with a linear characteristic would be employed, the following disadvantage would occur: If the amplification factor of the amplifier is made of a size so as to be sufficient for the dynamic part of the control operation, for example, for the braking of the servomotor, this motor would require a relatively high starting voltage and will therefore start too late. If, however, the amplifying factor is made of a size in accordance with the starting voltage of the motor, the speed of the motor will be too large in relation to the required speed for correctly adjusting the element which is to be adjusted by the servomotor and this element will then be adjusted to a value beyond that which is desired. Consequently, there will then be the danger that the entire apparatus will start to oscillate.

In order to prevent these disadvantages, the invention further provides that within the regulating section of the control unit a part of the rectified bridge voltage which is adjustable by a potentiometer is linear amplified and added to a predetermined voltage which is adjustable at will. This permits the voltage as supplied by the regulating section to be adapted to the starting voltage of the servomotor and the amplifying factor of the regulating section to be adapted to the dynamic characteristic of the motor and especially to the braking capacity of the latter.

In order to increase the accuracy of adjustment of the element to be adjusted by making the braking capacity of the servomotor as high as possible, the invention further provides that parallel to the armature of the servomotor an electric resistor of a size in accordance with the type of servomotor is connected so that a braking current will flow through this resistor as soon as one of the relays is actuated and the voltage on the emitter of the output transistor of the regulating section which is induced in the armature of the motor when rotating has a value higher than the voltage on the base of the output transistor. By providing such a resistor and by deenergizing the relays shortly before the bridge is balanced whereby a complete short-circuit of the motor is attained, the balancing procedure will follow an approximately logarithmic course.

The apparatus according to the invention may be employed with particular advantage for a remote adjustment and control of the control element of a vlave and especially of a throttling element of a flow control valve which, according to another feature of the invention, is to be driven by a geared motor the driven shaft of which, which is to be connected to the element to be controlled, for example, the throttling element, also drives a setting element, for example, a potentiometer, which is thus adjusted in accordance with the rotary position of the element to be controlled. The geared motor may be mounted in a very simple manner on the valve itself, and the driven shaft of this motor should be positively connected to the control element of this valve. The supply of current to the geared motor may be controlled from a remote point, for example, by a program control.

A preferred embodiment of such a program control of a valve is attained according to the invention by providing the setting element in the form of a part of an actual-value potentiometer which together with a nominal-value potentiometer forms a component of a measuring bridge the output voltage of which is employed for operating the geared motor. For attaining a program control, for example, for controlling the feed of a tool by means of a hydraulic cylinder, the invention then provides several nominal-value potentiometers which are adjusted to different fixed values and may be alternately included as desired into the bridge circuit. For switching these potentiometers on and off, it is possible to employ switching relays and/or limit switches.

These and further features and advantages of the present invention will become more clearly apparent from the following detailed description of an embodiment thereof in the form of a tool feeding mechanism as illustrated diagrammatically in the accompanying drawings, in which—

FIGS. 1 and 2 show two circuit diagrams of the entire apparatus;

FIG. 3 shows a longitudinal section of a motor-driven flow control valve; while

Figure 3:
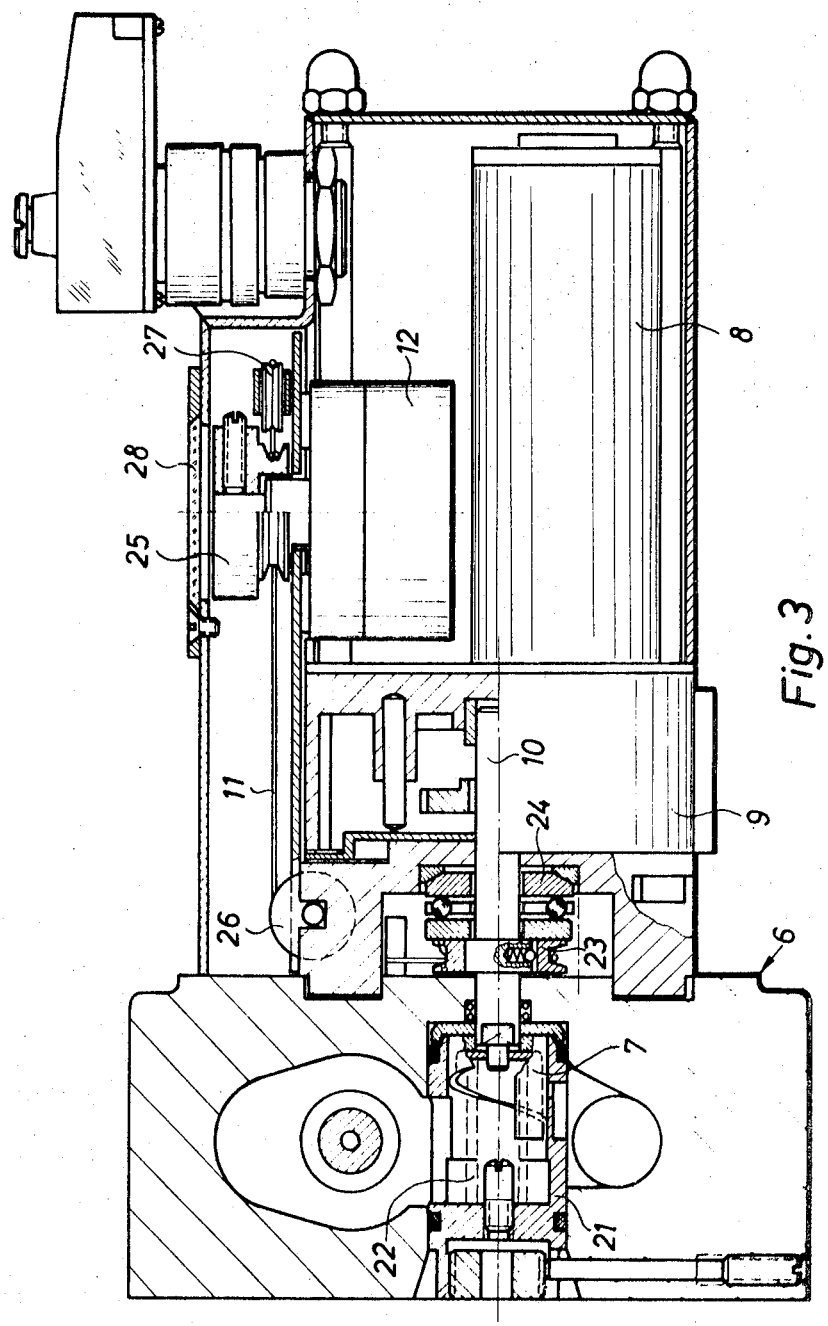

As illustrated diagrammatically in the drawings, a double-acting hydraulic cylinder 1 serves for feeding a nonrotatable drill 2 in the axial direction. The opposite sides of cylinder 1 may be alternately connected to or disconnected from a pump 4 or an oil tank 5 by means of a magnetically operated 4/3-way valve 3. Into the return line between this valve 3 and the tank 5 a flow control valve 6 is connected which, as shown in FIG. 3, comprises a throttle element 7 which is adjustable to different aperture sizes and may be driven by a direct-current shunt-wound motor 8 through a gear transmission 9. The driven shaft 10 of the transmission 9 is connected by a rope drive 11 to an actual-value setter in the form of a potentiometer 12 which forms a component of a measuring bridge which also comprises a nominal-value setter in the form of a potentiometer 13 which may be adjusted at will. The output voltage of the measuring bridge is amplified by an amplifier in the form of a control unit 14 and then serves for operating the motor 8.

In addition to the nominal-value potentiometer 13, the apparatus may be provided with any desired number of similar potentiometers 13' and 13" and each potentiometer is connected to a switch 15, 15' or 15", respectively. The potentiometer 13 is additionally connected to a further switch 15'''. All of these switches 15 to 15''' may be actuated by a control member 16 projecting from the piston rod of cylinder 1.

The nominal-value potentiometer 13 is adjusted so as to permit a large quantity of oil to flow through the flow control valve 6 so that the piston in cylinder 1 will be moved as rapidly as possible. The nominal-value potentiometer 13", however, is adjusted so as to effect the least permissible flow and the potentiometer 13' to effect a slightly larger flow of oil through the flow control valve 6. Switch 15 controls the quick feed movement and switch 15''' the quick return of the piston in cylinder 1. Thus, when switch 15 is actuated, drill 2 will be quickly moved forwardly until the control member 16 actuates the switch 15' and thereby considerably reduces the forward speed of the drill. Switch 15" then controls the working feed of drill 2, while at the end of this movement switch 15''' will be actuated so as to effect the rapid return of the piston in cylinder 1 together with the drill 2.

The throttling element 7 in the flow control valve 6 is rotatably mounted in a throttling sleeve 21 so as to vary the rate of flow of the valve and it is arrested in the adjusted position by a spring 22. Into the throttling element 7 the flattened end of drive shaft 10 engages which is provided with a flange on which a rope pulley 23 is mounted which is nonrotatably connected by a locking device to drive shaft 10. Between the rope pulley 23 and the transmission 9 a thrust bearing 24 is provided.

The rope or cable of the rope drive 11 which connects the pulley 23 to the drive wheel 25 of the actual-value potentiometer 12 passes over a pair of guide pulleys 26 and is maintained at the proper tension by a tightening device which comprises a pulley 27 which is mounted on a lever which is acted upon by a spring. Drive wheel 25 is visible from the outside through a window 28 so that the particular rotary position of the control element of the potentiometer 12 may be checked at any time by means of a scale and a pointer. The opposite ends of the rope or cable of the rope drive 11 are secured to the pulley 23 after being wound at least partly around it.

Figure 4:
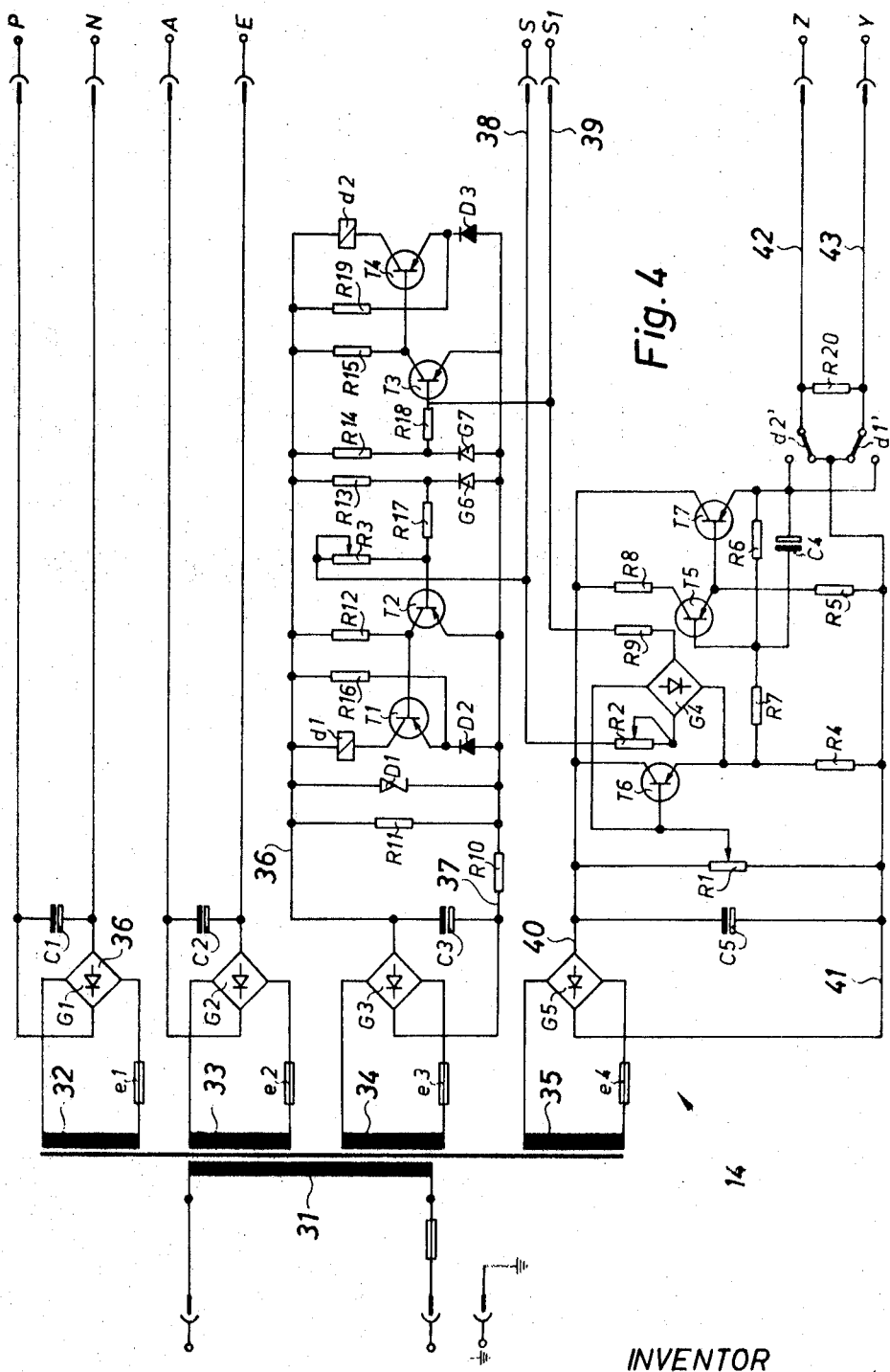
FIG. 4 shows a circuit diagram of the control unit according to the invention.

The control unit 14 as illustrated in FIG. 4 comprises a transformer with a primary winding 31 and four secondary windings 32 to 35. The first winding 32 supplies an auxiliary voltage via a fuse e1 and a rectifier G1 and smoothed by a condenser C1 to the terminals P and N from which it may be conducted to the nominal-value potentiometers 13, 13', and 13" for actuating the switching relays.

The second winding 33 supplies a bridge input voltage via a fuse e2 and a rectifier G3 and smoothed by a condenser C2 to the terminals A and E to which the measuring bridge is connected which is formed by one of the potentiometers 13, 13', or 13" and the actual-value potentiometer 12.

The third winding 34 produces a voltage which via a fuse e2 and a rectifier G3 and smoothed by a condenser C3 is supplied to a two-part bipolar-operative relay or switching unit with a two-stage amplifier, one part of which comprises the transistors T1 and T2 and a relay d1 and the other part the transistors T3 and T4 and a relay d2. Into one of the two conductors 36 and 37 which are connected to the rectifier G3 a resistor R10 is inserted, while the two conductors 36 and 37 are connected to each other by a resistor R11 and a break-down diode D1 which serves for maintaining the voltage constant. For producing and stabilizing the base voltage for the transistor T2 and the transistor T3, a rectifier G6 in series with a resistor R14 are provided.

The conductors connecting the resistor R13 with the rectifier G6 and the resistor R14 with the rectifier G7 are connected to the base of the transistor T2 or T3, respectively. The emitter of each transistor T2 and T3 is connected via a rectifier G2 or G3 to the conductor 37, while its collector is connected via the relay d1 or d2 to the conductor 36. Each collector is also connected to the base of the transistor T1 or T4, the emitter of which is connected via a rectifier G2 or G3 to the conductor 37 and via the relay d1 or d2 to the conductor 36. The conductor between the emitter of each transistor T1 and T4 and the associated rectifier D2 or D3 is connected to the conductor 36 by a resistor R16 or R19, respectively. The base of the transistor T2 is connected by a potentiometer R3 to a bridge output conductor 38, and the base of the transistor T3 is directly connected to a bridge output conductor 39.

The fourth winding 35 of the transformer likewise supplies via a fuse e4 and a rectifier G5 a voltage for operating a regulating unit comprising the transistors T5 to T7. The two lines 40 and 41 which are supplied with current by the rectifier G5 are connected to a condenser C5 and a potentiometer R1 the slide member of which is connected to the base of the transistor T6 and also to one direct-current side of a rectifier G4, the other side of which is connected to the emitter of the transistor T6. The alternating-current terminals of the rectifier G4 are connected to the output conductors 38 and 39 through adjustable resistors R2 and R9, respectively. The collector of the transistor T6 is connected to the conductor 40 and the emitter of this transistor through a resistance R4 to the conductor 41.

The base of the transistor T5 is connected through a resistor R7 to the emitter of the transistor T6, its collector through a resistor R8 to the conductor 40, and its emitter through a resistor R5 to the conductor 41. The emitter of the transistor T5 is further connected to the base of the transistor T7, the collector of which is connected to the base of the transistor T5 through a resistor R6 and in parallel thereto to a condenser C4 which is provided for quenching the sparks on the relay contacts.

The end of conductor 41 branches off to the normally closed or rest contact $d1'$ and $d2'$ of the relay $d1$ and $d2$, respectively, and the emitter of the transistor T7 is connected to the make contact of each relay $d1$ and $d2$. The contact arms of these relays are connected by conductors 42 and 43 between which a resistor R20 is provided to terminals Z and Y and from the latter to the armature of the servomotor 8 which as a direct-current shunt-wound motor may, if desired, also be provided with a permanent field excitation.

If the measuring bridge is unbalanced by being connected to one of the nominal-value potentiometers 13, 13' or 13", one or the other relay $d1$ or $d2$ will be energized depending upon the amount and the direction of the unbalance toward the negative or positive side. The associated contact arm $d1'$ or $d2'$ will thereby be pivoted from its normal position to its operative position so that the armature of the servomotor 8 will be connected to the emitter side of the transistor T7. Since the potentiometer R1 is already adjusted to a basic voltage which corresponds to the starting voltage of the armature of the servomotor 8, the latter will start to run. The voltage derived from the potentiometer R1 together with the part of the output voltage of the bridge which is determined by the adjustment of the potentiometer R2 serve for controlling the regulating section of the control unit 14 which supplies the current which is necessary for driving the servomotor 8. The input voltage for the regulating section is that between the emitter and the base of the transistor T6. This input voltage is the above-mentioned part of the output voltage of the bridge.

The servomotor 8 then begins to turn the throttle element 7 and thus to change the cross-sectional size of the flow passage of this element. The nominal-value potentiometer 12 is hereby adjusted in such a manner that the output voltage of the bridge will be reduced. Due to this reduction of the output voltage of the bridge, the regulating section will receive a lower input voltage and therefore the servomotor 8 will also receive a lower voltage. However, due to their inertia, the rotating parts of the motor tend to maintain their speed whereby a voltage will be induced in the armature of the motor which is higher than the driving voltage which is supplied by the regulating section for the operation of the motor. The voltage on the emitter of the transistor T7 is therefore higher than the voltage on the transistor base which corresponds to the voltage which is supplied at the particular moment by the measuring bridge. The transistor T7 is thereby blocked so that no current can flow from the collector to the emitter and thus to the servomotor 8. The induced countervoltage then flows through the resistor R20 and the armature of the motor and thereby reduces the speed of the servomotor 8.

If the servomotor is slowed down too much, the voltage will be reduced which is induced in the armature. If the voltage on the base of the transistor T7 is higher than the voltage on its emitter, the regulating section will again supply a driving voltage for the motor which, however, is of a lower size than the voltage which occurs at the beginning of the balancing of the measuring bridge and corresponds to the state of the balancing procedure at that particular moment. The speed of the servomotor 8 is in this manner adapted to the decreasing output voltage of the measuring bridge. Shortly before the complete balance of the bridge its output voltage will become too small so that the pulled-up relay $d1$ or $d2$ will be deenergized. The servomotor will thereby be disconnected from the regulating section of the control unit 14 and the armature of the motor will be short-circuited through the contact $d1'$ or $d2'$ so that the motor will be stopped completely.

From the foregoing it is thus evident that due to the bipolar arrangement of the relay section of the control unit either the relay $d1$ or the relay $d2$ will be actuated depending upon the direction of the balancing procedure so that the servomotor 8 will be driven in one or the other direction.

The regulating section of the control unit 14 therefore supplies a fixed but adjustable starting voltage which suffices for the basic speed of the servomotor 8 and to which a voltage is then added which is amplified in proportion to the size of the output voltage of the bridge. By its cooperation with the shunt-wound direct current motor the regulating section of the control unit 14 has an approximately logarithmic regulating characteristic whereby very short setting times of, for example, 0.5 second at an extremely small adjustment aberration of, for example, 0.5% may be attained. The relay section of the control unit is provided with a bipolar input stage which has an adjustable actuating voltage of a few millivolts and energizes the relay $d1$ or the relay $d2$ depending upon whether the output voltage of the bridge has a positive or negative value. The motor will start to run immediately as soon as the regulating section of the control unit is connected to the motor by means of one of the relays $d1$ or $d2$.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. In an apparatus for controlling the operation of an electric servomotor and especially a shunt-wound direct current motor of a flow control valve for operating a hydraulic cylinder comprising an electric measuring bridge having two branches, an adjustable nominal-value setter in one of said branches, an actual-value setter in the other branch which is dependent upon the rotary position of the drive shaft of said motor, and a control unit for amplifying the output voltage of said bridge for driving said motor, the improvement comprising two relays adapted in their normal position of rest to short-circuit the armature of said motor, said control unit comprising a relay section having a low actuating voltage for actuating one or the other of said relays dependent upon the polarity of the output voltage of said bridge, said control unit further comprising a regulating section adapted to supply a voltage having a strength sufficient for starting said motor to which a voltage is added which is amplified in proportion to the output voltage of said bridge, an electric resistance element connected in parallel to the armature of said motor and having a resistance depending upon the type of said armature, said regulating section having an output transistor, said control unit being designed so that a braking current will flow through said resistance element as soon as one of said relays is actuated and the voltage induced in said armature by the rotation thereof and lying on the emitter of said output transistor is higher than the voltage on the base of said transistor.

2. In an apparatus for controlling the operation of an electric servomotor and especially a shunt-wound direct current motor of a flow control valve for operating a hydraulic cylinder comprising an electric measuring bridge having two branches, an adjustable nominal-value setter in one of said branches, an actual-value setter in the other branch which is dependent upon the rotary position of the drive shaft of said motor, and a control unit for amplifying the output voltage of said bridge for driving said motor, the improvement comprising two relays adapted in their normal position of rest to short-circuit the armature of said motor, said control unit comprising a relay section having a low actuating voltage for actuating one or the other of said relays dependent upon the polarity of the output voltage of said bridge, said control unit further comprising a regulating section adapted to supply a voltage having a strength sufficient for starting said motor to which a voltage is added which is amplified in proportion to the output voltage of said bridge, said flow control valve comprising a flow control member adjustable to different rotary positions, said actual-value setter comprising an adjustable potentiometer, said motor having a gear transmission, and said transmission having a driven shaft connected to said flow control member and adapted to drive said potentiometer so that said potentiometer will be adjusted to a position in accordance with the rotary position of said flow control member, a housing containing said motor and said transmission, said potentiometer being mounted on said housing, a rope drive connecting said driven shaft to said potentiometer for driving the same, and means for maintaining said rope drive under tension.

3. An apparatus as defined in claim 2, further comprising a spring for maintaining said flow control member in its adjusted position on said driven shaft at one end of said housing.

References Cited
UNITED STATES PATENTS

Re. 26,404  6/1968  Lunn et al. __ 318—(20.810.6X)
2,914,717  11/1959  Redding ____ 318—(20.810.6X)

THOMAS E. LYNCH, Primary Examiner

U.S. Cl. X.R.
318—612